(12) United States Patent
Prasad

(10) Patent No.: US 8,573,762 B1
(45) Date of Patent: Nov. 5, 2013

(54) INKJET INKS HAVING SUSTAINED DECAP

(71) Applicant: Hewlett-Packard Development Company, LP, Houston, TX (US)

(72) Inventor: Keshava A. Prasad, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/679,989

(22) Filed: Nov. 16, 2012

(51) Int. Cl.
*G01D 11/00* (2006.01)

(52) U.S. Cl.
USPC ............................................. 347/100; 347/43

(58) Field of Classification Search
USPC ........................ 347/15, 43, 95–100
See application file for complete search history.

(56) References Cited

U.S. PATENT DOCUMENTS

| | | | |
|---|---|---|---|
| 7,370,952 B2 * | 5/2008 | Inoue et al. | 347/100 |
| 7,872,060 B2 | 1/2011 | Schmid et al. | |
| 8,142,558 B2 | 3/2012 | Robertson et al. | |
| 8,492,456 B2 * | 7/2013 | Chen et al. | 523/160 |
| 2009/0056588 A1 | 3/2009 | Jackson | |

FOREIGN PATENT DOCUMENTS

| | | |
|---|---|---|
| WO | 2009079070 | 6/2009 |
| WO | 2012088122 | 6/2012 |

\* cited by examiner

*Primary Examiner* — Thinh Nguyen

(57) ABSTRACT

The present disclosure provides sustained decap for inkjet inks and related methods. As such, an inkjet ink composition can comprise a linear polyurethane binder having a weight average molecular weight of less than 50,000 Mw; from 5 wt % to 20 wt % of an organic cosolvent system including a first organic cosolvent selected from the group of 2-hydroxyethylurea, 1,2,6-hexanetriol, di-(2-hydoxyethyl)-5,5-dimethylhydantoin, 1,1,1,-tris(hydroxymethyl)ethane, 1,2,4-butanetriol, and mixtures thereof; water; and a colorant. Additionally, the organic cosolvent system can also comprise less than 5 wt % total organic cosolvent having a boiling point less than 250° C. based on the weight of the inkjet ink composition.

15 Claims, No Drawings

INKJET INKS HAVING SUSTAINED DECAP

BACKGROUND

There are several reasons that inkjet printing has become a popular way of recording images on various media surfaces, particularly paper and photo media substrates. Some of these reasons include low printer noise, capability of high-speed recording, and capability of multicolor recording. Additionally, these advantages can be obtained at a relatively low price to consumers. With respect to inkjet ink chemistry, the majority of commercial inkjet inks are water-based. Thus, their constituents are generally water-soluble, as is the case with many dyes, or water dispersible, as is the case with pigments. Furthermore, inkjet inks have low viscosity to accommodate high frequency jetting and firing chamber refill processes can be typical ink inkjet architecture. Inks having positive printing characteristics with respect to inkjet architecture often have less than ideal performance on the printed page, and vice versa. Thus, finding additional formulations that perform well in a printer device as well as on print media would be an advancement in the art.

DETAILED DESCRIPTION

It has been recognized that many traditional inkjet inks do not have sufficient sustained decap for printing in page-wide array print heads. This is because many of these types of printers can utilize a relatively longer period of time between firing while a given printhead may be uncapped. As used herein "decap" refers to the number of spits that are used to refresh uncapped print head nozzles after a given period of time, such that their firing characteristics substantially match their initial, out-of-cap performance. As such, decap can be referred to as a 4 second decap, an 8 second decap, a 1 minute decap, etc. As used herein, "sustained decap" refers to the number of printed lines on a 8.5 inch paper with 1 inch margins that a given ink can be printed with a specific decap (e.g. 1 second decap, 4 second decap, etc.) before the printed lines visually degrade. Particularly, page-wide array ("PWA") printing does not function in the same manner as normal inkjet printers, so inks with relative short decap performance can be problematic.

Conventional inkjet print heads span less than one inch and are scanned across the page. To perform a print operation, the print head is moved in one direction while the page is moved in a perpendicular direction. In effect, the print head scans the page while ejecting ink droplets to form the desired printout. When not in use, the print head moves into a service area where the print head is cleaned then capped. As the print head moves into a rest position, it traverses an elastomeric wiper (e.g., nitrile rubber). The wiper wipes ink from the print head surface. Scrapers are then used in some embodiments to clean off the wipers.

A PWA print head spans an entire page width (e.g. 8.5 inches) and includes thousands of nozzles. The PWA print head thus has many more nozzles than the scanning-type print heads discussed above, and is generally formed on an elongated printbar. The printbar typically is oriented orthogonally to the paper path. During operation, the printbar and PWA print head are fixed while a page is fed adjacent to the print head. The PWA print head prints one or more lines at a time as the page moves relative to the print head. This compares to the printing of multiple characters at a time as achieved by scanning-type print heads.

Depending on the printout characteristics, certain nozzles on a PWA print head may be exercised less than other nozzles. For example, a user may print most of the time using one inch margins, and on occasion use less than one inch margins. The nozzles in the one inch margin area thus get exercised less regularly, and may clog more readily. This characteristic of uneven nozzle exercise is less common for a scanning-type print head. Scanning print head nozzles that start out in the margin area subsequently move out of the margin area and get exercised as the print head scans the page width.

Thus, certain nozzles on a PWA print head are more prone to clogging than on a scanning-type print head. Thus, in general, the problem of drying ink is more pronounced for a PWA print head than for a scanning-type print head. Accordingly, it has been recognized that an inkjet ink having sustained decap would be more valuable in printing in PWA printing systems.

In accordance with this, an inkjet ink composition can comprise a linear polyurethane binder having a weight average molecular weight of less than 50,000 Mw; from 5 wt % to 20 wt % of an organic cosolvent system including a first organic cosolvent selected from the group of 2-hydroxyethylurea, 1,2,6-hexanetriol, di-(2-hydoxyethyl)-5,5-dimethylhydantoin, 1,1,1,-tris(hydroxymethyl)ethane, 1,2,4-butanetriol, and mixtures thereof; water; and a colorant. Additionally, the organic cosolvent system can also comprise less than 5 wt % total organic cosolvent having a boiling point less than 250° C. based on the weight of the inkjet ink composition. In one example, the inkjet ink composition can be part of a system to be used with printer comprising a page-wide array print head.

In another example, a method for manufacturing an inkjet ink composition having sustained decap can comprise combining an organic cosolvent system with a linear polyurethane binder having a weight average molecular weight less than 50,000 Mw to form a mixture. The organic cosolvent system can include a first organic cosolvent selected from the group of 2-hydroxyethylurea, 1,2,6-hexanetriol, di-(2-hydoxyethyl)-5,5-dimethylhydantoin, 1,1,1,-tris(hydroxymethyl)ethane, 1,2,4-butanetriol, and mixtures thereof. Additional steps include adding a colorant and water to the mixture thereby forming the inkjet ink composition. In this example, the organic cosolvent system can be present in the inkjet ink composition at from 5 wt % to 20 wt %, and the organic cosolvent system can also include less than 5 wt % total organic cosolvent having a boiling point less than 250° C. based on the weight of the inkjet ink composition.

It is noted that when discussing the present compositions and methods, each of these discussions can be considered applicable to each of these embodiments, whether or not they are explicitly discussed in the context of that embodiment. Thus, for example, in discussing a linear polyurethane binder in an inkjet ink composition, such a linear polyurethane binder can also be used in a method of manufacturing an inkjet ink, and vice versa.

Traditionally inkjet inks printed from conventional inkjet printers often do not need to have a sustained decap, as the printing demands are less and the printing systems can be cleaned in a variety of ways not typically available to PWA printing systems, such as by spitting ink droplets into a spittoon prior to printing on the substrate. However, it has been recognized that a specific solvent system can be used with linear polyurethane polymers to provide sustained decap for printing from PWA print heads in particular. For example, an inkjet ink can be manufactured with a linear polyurethane polymer and an organic cosolvent in effective amounts to provide a sustained decap of at least 50 printed lines with a 4 second decap. In one aspect, the sustained decap can be at least 100 printed lines with a 4 second decap. In another aspect, the sustained decap can be at least 120 printed lines with a 4 second decap.

The present solvent system used includes at least one organic cosolvent including 2-hydroxyethylurea, 1,2,6-hexanetriol, di-(2-hydoxyethyl)-5,5-dimethylhydantoin, 1,1,1,-tris(hydroxymethyl)ethane, 1,2,4-butanetriol, or mixtures thereof. In one example, the solvent system can be a binary solvent system wherein the inkjet ink includes a second organic cosolvent including 2-hydroxyethylurea, 1,2,6-hexanetriol, di-(2-hydoxyethyl)-5,5-dimethylhydantoin, 1,1,1,-tris(hydroxymethyl)ethane, or 1,2,4-butanetriol. As used herein, "organic cosolvent" does not include water, as water is included separately. Generally, the amount of total organic cosolvents present in the inkjet ink can range from 5 wt % to about 20 wt %. In another example, the total concentration of cosolvent can be present in a range from 10 wt % to 20 wt %. In another example, the total cosolvent concentration can be present in a range from 12 wt % to 17 wt %, and in one aspect, from 14 wt % to 16 wt %. Additionally, the remaining balance of the inkjet ink composition can be water, and optionally, minor amounts of any other typical additives that may be present in inkjet ink compositions, e.g., surfactant, biocides, viscosity modifiers, etc. In one example, water can be present in the inkjet ink composition in an amount ranging from 50 wt % to 90 wt %.

Generally, the amount of low boiling point organic solvents, those with a boiling point of less than 250° C., can be less than 5 wt % (based on the weight of the inkjet ink composition as a whole). In one example, the inkjet ink composition contains less than 3 wt % of organic cosolvents having a boiling point of less than 250° C. Additionally, in one aspect, the inkjet ink composition can exclude organic cosolvents having a boiling point of less than 250° C.

Generally, the colorant discussed herein can include a pigment and/or dye. As used herein, "dye" refers to compounds or molecules that impart color to an ink vehicle. As such, dye includes molecules and compounds that absorb electromagnetic radiation or certain wavelengths thereof. For example, dyes include those that fluoresce and those that absorb certain wavelengths of visible light. Generally, dyes are water soluble. Furthermore, as used herein, "pigment" generally includes pigment colorants, magnetic particles, aluminas, silicas, and/or other ceramics, organo-metallics or other opaque particles. In one example, the colorant can be a pigment. In another example, the colorant can be present in the inkjet ink composition in an amount ranging from 0.1 wt % to 6 wt. In another aspect, the colorant can be a colored pigment, including black, yellow, magenta, cyan, etc.

The present inkjet inks generally include a linear polyurethane binder. The linear polyurethane binder can be present in the inkjet ink in an amount ranging from 0.2 wt % to 5 wt %. Additionally, the linear polyurethane binder can have a weight average molecular weight (Mw) ranging from 20,000 Mw to below 50,000 Mw and has an acid value ranging from about 20 mg KOH/g polymer to about 55 mg KOH/g polymer.

The ink-jet ink compositions of the present disclosure can also be suitable for use on many types of substrates of recording media, including but not limited, cellulose-based paper media including plain paper and photopaper. In one example, the media can be gloss media.

Typical inkjet inks described herein include water, and can further include organic co-solvents as discussed herein. Further, additional non-ionic, cationic, and/or anionic surfactants can be present, ranging from 0.01 wt % to 10 wt %. In one example, the surfactant can be present in an amount ranging from 0.01 wt % to 5 wt %. In addition to the colorant or the latex, the balance of the formulation can be purified water, or other vehicle components known in the art, such as biocides, viscosity modifiers, materials for pH adjustment, sequestering agents, preservatives, and the like.

Consistent with the formulation of this disclosure, various other additives may be employed to enhance the properties of the ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, NUOSEPT® (Nudex, Inc.), UCARCIDE™ (Union carbide Corp.), VANCIDE® (R.T. Vanderbilt Co.), PROXEL® (ICI America), and combinations thereof.

Sequestering agents, such as EDTA (ethylene diamine tetra acetic acid), may be included to eliminate the deleterious effects of heavy metal impurities, and buffer solutions may be used to control the pH of the ink. From 0.01 wt % to 2 wt %, for example, can be used. Viscosity modifiers and buffers may also be present, as well as other additives known to those skilled in the art to modify properties of the ink as desired. Such additives, if present, can be included at from 0.01 wt % to 20 wt %.

In further detail regarding the method specifically, any of the steps can be performed in a number of sequences and are not intended to be limited to the order written. For example, the colorant can be added to the linear polyurethane binder before the first organic cosolvent is combined with the linear polyurethane binder, and vice versa. Additionally, it is noted that any and all combinations of such steps or individual step may be performed sequentially or simultaneously. For example, combining the linear polyurethane binder with the first organic cosolvent and adding the colorant may be performed sequentially or may be performed simultaneously.

In addition to the inkjet inks and methods, an inkjet ink system can comprise a page-wide array printer and any inkjet ink composition described herein.

Additionally, it is to be understood that this disclosure is not limited to the particular process steps and materials disclosed herein because such process steps and materials may vary somewhat. It is also to be understood that the terminology used herein is used for the purpose of describing particular examples only. The terms are not intended to be limiting because the scope of the present disclosure is intended to be limited only by the appended claims and equivalents thereof.

It is be noted that, as used in this specification and the appended claims, the singular forms "a," "an," and "the" include plural referents unless the context clearly dictates otherwise.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc. Additionally, a numerical range with a lower end of "0" can include a sub-range using "0.1" as the lower end point.

EXAMPLES

The following illustrates some examples of the present ink-jet ink compositions and methods that are presently known. However, it is to be understood that the following are only exemplary or illustrative of the application of the principles of the present compositions and methods. Numerous modifications and alternative compositions and methods may be devised by those skilled in the art without departing from the spirit and scope of the present compositions and methods. The appended claims are intended to cover such modifications and arrangements. Thus, while the present inkjet inks and methods have been described above with particularity, the following examples provide further detail in connection with what are presently deemed to be the acceptable embodiments.

Example 1

Polyurethane Ink Compositions

A linear polyurethane composition was manufactured according to the compositional elements and amounts listed in Table 1, the balance of the vehicle being water. Additionally, a general polyurethane ink composition was manufactured according to the compositional elements and amounts listed in Table 2, the balance of the vehicle being water. Ink vehicle 2 includes 4.2 wt % of magenta pigment (dispersed with styrene acrylate polymer).

TABLE 1

| Compositional Component | Ink Vehicle 1 (wt %) | Ink Vehicle 2 (wt %) |
|---|---|---|
| Triethylene glycol | 10 | 0 |
| 2-pyrrolidone | 7 | 0 |
| di-(2-hydoxyethyl)-5,5-dimethylhydantoin | 4 | 8 |
| 2-hydroxylethyl-2-pyrrolidone | 0 | 1.5 |
| Linear polyurethane binder | 0.75 | 0.75 |

TABLE 2

| Compositional Component | Ink Vehicle 1 (wt %) | Ink Vehicle 2 (wt %) |
|---|---|---|
| Triethylene glycol | 10 | 0 |
| 2-pyrrolidone | 7 | 0 |
| di-(2-hydoxyethyl)-5,5-dimethylhydantoin | 4 | 8 |
| 2-hydroxylethyl-2-pyrrolidone | 0 | 1.5 |
| Polyurethane binder | 0.75 | 0.75 |

A 4 second decap test for each polyurethane formulation was evaluated as well as a sustained decap, measured as the number of minutes of continuous printing before failing, with a spitting frequency of 1 spit every 5 seconds. The sustained decap plots were printed on an ordinary office paper from a HP Officejet Pro 8500 desktop printer. One drop of ink is ejected from each of the nozzle in the printhead at every 5 sec for a duration of 10 minutes. Each 5 sec interval corresponds to a line on the page. A line is considered good if the drop on the paper is not misdirected more than a dot row or missing completely. The results are listed in tables 3 and 4.

TABLE 3

| | 4 Second Decap (number of spits to recover) | |
|---|---|---|
| Ink composition | Ink Vehicle 1 | Ink Vehicle 2 |
| Polyurethane | 2 | 2 |
| Linear Polyurethane | 9 | 3 |

TABLE 4

| | 10 Minute Sustained Decap (number of minutes before failing) | |
|---|---|---|
| Ink composition | Ink Vehicle 1 | Ink Vehicle 2 |
| Polyurethane | 10 | 0.3 |
| Linear Polyurethane | 0.5 | 1 |

As can be seen from Tables 3 and 4, the present linear polyurethane compositions have significant decap and sustained decap performance issues over a more standard polyurethane composition. Standard polyurethanes that don't have decap issues can include low Mw polymers, such as those lower than 20K, those containing monomers that don't adversely affect decap, those with decap friendly structures, etc.

Example 2

Linear Polyurethane Compositions

Various organic cosolvents combinations, as listed in Table 5, were tested for decap and sustained decap for compositions containing 0.75 wt % linear polyurethane binder from DIC and 4.2 wt % of a magenta pigment dispersion.

TABLE 5

| Cosolvent Composition | Amount (wt %) | 4 Second Decap (# of spits to recover) | Sustained Decap (# of good lines) (1 spit every 5 seconds) |
|---|---|---|---|
| di-(2-hydoxyethyl)-5,5-dimethylhydantoin | 15 | 1 | 7 |
| 2-hydroxylethyl-2-pyrrolidone | 15 | 1 | 7 |
| 1,1,1,-tris(hydroxymethyl)ethane/ di-(2-hydoxyethyl)-5,5-dimethylhydantoin | 12.75/ 2.25 | 1 | 40 |
| 1,2,4-butanetriol/ di-(2-hydoxyethyl)-5,5-dimethylhydantoin | 12.75/ 2.25 | 1 | 44 |
| 1,2,6-hexanetriol | 15 | 1 | 120 |
| 2-hydroxyethylurea/ di-(2-hydoxyethyl)-5,5-dimethylhydantoin | 12.75/ 2.25 | 1 | 120 |

Notably, sustained decap increased with the use of binary solvent systems and systems having high boiling point organic cosolvents.

Example 3

Binary Organic Cosolvent Polyurethane Compositions Using DHE

Binary organic cosolvent systems using di-(2-hydoxyethyl)-5,5-dimethylhydantoin (Dantacol® DHE) and various organic cosolvents were tested for decap and sustained decap as shown in Tables 6-10. The compositions also contained 0.75 wt % linear polyurethane binder from DIC and 4.2 wt % of a magenta pigment dispersion.

TABLE 6

| di-(2-hydoxyethyl)-5,5-dimethylhydantoin (wt %) | 2-hydroxyethyl-2-pyrrolidone (wt %) | 5 Second Decap (# of spits to recover) | Sustained Decap (# of good lines) (1 spit every 5 seconds) |
|---|---|---|---|
| 15 | 0 | 1 | 7 |
| 12.75 | 2.25 | 1 | 5 |
| 10 | 5 | 1 | 4 |
| 7.5 | 7.5 | 1 | 3 |
| 2.25 | 12.75 | 3 | 1 |
| 0 | 15 | 3 | 1 |

As shown in Table 6, higher ratio using 2-hydroxylethyl-2-pyrrolidone, made decap and sustained decap worse.

TABLE 7

| di-(2-hydoxyethyl)-5,5-dimethylhydantoin (wt %) | 1,1,1-tris(hydroxymethyl)ethane (wt %) | 4 Second Decap (# of spits to recover) | Sustained Decap (# of good lines) (1 spit every 5 seconds) |
|---|---|---|---|
| 15 | 0 | 1 | 7 |
| 12.75 | 2.25 | 1 | 9 |
| 10 | 5 | 1 | 16 |
| 7.5 | 7.5 | 1 | 13 |
| 2.25 | 12.75 | 1 | 40 |
| 0 | 15 | 1 | 36 |

As shown in Table 7, the best sustained decap was a binary system using both di-(2-hydoxyethyl)-5,5-dimethylhydantoin and 1,1,1,-tris(hydroxymethyl)ethane at 2.25 wt % and 12.75 wt %, respectively.

TABLE 8

| di-(2-hydoxyethyl)-5,5-dimethylhydantoin (wt %) | 1,2,6-hexanetriol (wt %) | 4 Second Decap (# of spits to recover) | Sustained Decap (# of good lines) (1 spit every 5 seconds) |
|---|---|---|---|
| 15 | 0 | 1 | 7 |
| 12.75 | 2.25 | 1 | 15 |
| 10 | 5 | 1 | 47 |
| 7.5 | 7.5 | 1 | 20 |
| 2.25 | 12.75 | 1 | 50 |
| 0 | 15 | 1 | 120 |

As shown in Table 8, the best sustained decap was using 1,2,6-hexanetriol.

TABLE 9

| di-(2-hydoxyethyl)-5,5-dimethylhydantoin (wt %) | 1,2,4-butanetriol (wt %) | 4 Second Decap (# of spits to recover) | Sustained Decap (# of good lines) (1 spit every 5 seconds) |
|---|---|---|---|
| 15 | 0 | 1 | 7 |
| 12.75 | 2.25 | 1 | 13 |
| 10 | 5 | 1 | 30 |
| 7.5 | 7.5 | 1 | 22 |
| 2.25 | 12.75 | 1 | 44 |
| 0 | 15 | — | — |

— Not tested

As shown in Table 9, the sustained decap improved using a binary system of di-(2-hydoxyethyl)-5,5-dimethylhydantoin with 1,2,4-butanetriol.

TABLE 10

| di-(2-hydoxyethyl)-5,5-dimethylhydantoin (wt %) | 2-hydroxyethylurea (wt %) | 4 Second Decap (# of spits to recover) | Sustained Decap (# of good lines) (1 spit every 5 seconds) |
|---|---|---|---|
| 15 | 0 | 1 | 7 |
| 12.75 | 2.25 | 1 | 25 |
| 10 | 5 | 1 | 36 |
| 7.5 | 7.5 | 1 | 96 |
| 2.25 | 12.75 | 1 | 120 |
| 0 | 15 | 1 | 45 |

As shown in Table 10, the sustained decap improved using a binary system of di-(2-hydoxyethyl)-5,5-dimethylhydantoin with 2-hydroxyethylurea. Particularly, the best sustained decap was a binary system of di-(2-hydoxyethyl)-5,5-dimethylhydantoin with 2-hydroxyethylurea at 2.25 wt % and 12.75 wt %, respectively.

Example 4

Polyurethane Compositions Using 1,2,6-Hexanetriol

A polyurethane composition having various amounts of 1,2,6-hexanetriol were tested for decap and sustained decap as shown in table 11. The composition also contained 0.75 wt % linear polyurethane binder from DIC, 4.2 wt % of a magenta pigment dispersion from DIC, 0.30 wt % of a surfactant (Surfynol® 440), 0.10 wt % of a surfactant (Surfadone® LP-300), 0.10 wt % of microbicide (Proxel® GXL), and 0.14 wt % of microbicide (Kordek™ MLX).

TABLE 11

| 1,2,6-hexanetriol (wt %) | 4 Second Decap (# of spits to recover) | Sustained Decap (# of good lines) (1 spit every 5 seconds) |
|---|---|---|
| 20 | 1 | 20 |
| 17.5 | 1 | 32 |
| 15 | 1 | 120 |
| 12.5 | 1 | 50 |
| 10 | 1 | 20 |

As shown in Table 11, 1,2,6-hexanetriol was most effective in an amount of 15 wt % for the present system.

Example 5

Binary Cosolvent Polyurethane Compositions Using 1,2,6-hexanetriol and 1,1,1,-tris(hydroxymethyl)ethane A polyurethane composition having various amounts of 1,2,6-hexanetriol and 1,1,1,-tris(hydroxymethyl)ethane were tested for decap and sustained decap as shown in table 12. The composition also contained 0.75 wt % linear polyurethane binder from DIC, 4.2 wt % of a magenta pigment dispersion from DIC, 0.30 wt % of a surfactant (Surfynol® 440), 0.10 wt % of a surfactant (Surfadone® LP-300), 0.10 wt % of microbicide (Proxel® GXL), and 0.14 wt % of microbicide (Kordek™ MLX).

TABLE 12

| 1,2,6-hexanetriol (wt %) | 1,1,1,-tris(hydroxymethyl)ethane (wt %) | 4 Second Decap (# of spits to recover) | Sustained Decap (# of good lines) (1 spit every 5 seconds) |
|---|---|---|---|
| 15 | 0 | 1 | 120 |
| 10 | 5 | 1 | 50 |
| 7.5 | 7.5 | 1 | 30 |
| 5 | 10 | 1 | 39 |
| 0 | 15 | 1 | 36 |

As shown in Table 12, the binary systems generally provided better sustained decap than solely using 1,1,1,-tris(hydroxymethyl)ethane. 1,2,6-hexanetriol was most effective for the present system.

What is claimed is:

1. An inkjet ink composition having sustained decap, comprising:
   a linear polyurethane binder having a weight average molecular weight of less than 50,000 Mw;
   from 5 wt % to 20 wt % of an organic cosolvent system including a first organic cosolvent selected from the group of 2-hydroxyethylurea, 1,2,6-hexanetriol, di-(2-hydoxyethyl)-5,5-dimethylhydantoin, 1,1,1,-tris(hydroxymethyl)ethane, 1,2,4-butanetriol, and mixtures thereof, wherein the organic cosolvent system also comprises less than 5 wt % total organic cosolvent having a boiling point less than 250° C. based on the weight of the inkjet ink composition;
   water; and
   a colorant.

2. The inkjet ink composition of claim 1, wherein the organic cosolvent system is a binary organic cosolvent system comprising a second organic cosolvent.

3. The inkjet ink composition of claim 2, wherein the second organic cosolvent is selected from the group of 2-hydroxyethylurea, 1,2,6-hexanetriol, di-(2-hydroxyethyl)-5,5-dimethylhydantoin, 1,1,1,-tris(hydroxymethyl)ethane, and 1,2,4-butanetriol, and wherein the total amount of organic cosolvent present ranges from 12 wt % to 17 wt %.

4. The inkjet ink composition of claim 1, wherein the colorant is a pigment and is present at from 0.1 wt % to 6 wt % of the inkjet ink composition.

5. The inkjet ink composition of claim 1, wherein the linear polyurethane binder is present at from 0.2 wt % to 5 wt % of the inkjet ink composition.

6. The inkjet ink composition of claim 1, wherein the linear polyurethane binder has a weight average molecular weight ranging from 20,000 Mw to below 50,000 Mw and has an acid value ranging from about 20 mg KOH/g polymer to about 55 mg KOH/g polymer.

7. The inkjet ink composition of claim 1, wherein the inkjet ink composition contains less than 3 wt % of organic cosolvents having a boiling point of less than 250° C.

8. The inkjet ink composition of claim 1, wherein the inkjet ink composition excludes organic cosolvents having a boiling point of less than 250° C.

9. The inkjet ink composition of claim 1, wherein the inkjet ink composition provides a sustained decap of at least 50 printed lines with a 4 second decap.

10. A method for manufacturing an inkjet ink composition having sustained decap, comprising:
    combining an organic cosolvent system with a linear polyurethane binder having a weight average molecular weight less than 50,000 Mw to form a mixture, the organic cosolvent system including a first organic cosolvent selected from the group of 2-hydroxyethylurea, 1,2,6-hexanetriol, di-(2-hydoxyethyl)-5,5-dimethylhydantoin, 1,1,1,-tris(hydroxymethyl)ethane, 1,2,4-butanetriol, and mixtures thereof; and
    adding a colorant and water to the mixture thereby forming the inkjet ink composition,
    wherein the organic cosolvent system is present in the inkjet ink composition at from 5 wt % to 20 wt %, and wherein the organic cosolvent system also comprises less than 5 wt % total organic cosolvent having a boiling point less than 250° C. based on the weight of the inkjet ink composition.

11. The method of claim 10, wherein the linear polyurethane binder is present at from 0.2 wt % to 5 wt %.

12. The method of claim 10, wherein the organic cosolvent system is a binary organic cosolvent system comprising a second organic cosolvent.

13. The method of claim 12, wherein the second organic cosolvent is selected from the group of 2-hydroxyethylurea, 1,2,6-hexanetriol, di-(2-hydoxyethyl)-5,5-dimethylhydantoin, 1,1,1,-tris(hydroxymethyl)ethane, and 1,2,4-butanetriol, and wherein the total amount of organic cosolvent present ranges from 12 wt % to 17 wt %.

14. The method of claim 10, wherein the inkjet ink composition excludes organic cosolvents having a boiling point of less than 250° C.

15. A printing system, comprising:
    a page-wide array print head; and
    an inkjet ink composition having sustained decap and adapted for use with the page-wide array printhead, the inkjet ink composition, comprising:
    a linear polyurethane binder having a weight average molecular weight of less than 50,000 Mw;
    from 5 wt % to 20 wt % of an organic cosolvent system including a first organic cosolvent selected from the group of 2-hydroxyethylurea, 1,2,6-hexanetriol, di-(2-hydoxyethyl)-5,5-dimethylhydantoin, 1,1,1,-tris(hydroxymethyl)ethane, 1,2,4-butanetriol, and mixtures thereof, wherein the organic cosolvent system also comprises less than 5 wt % total organic cosolvent having a boiling point less than 250° C. based on the weight of the inkjet ink composition;
    water; and
    a colorant.

* * * * *

UNITED STATES PATENT AND TRADEMARK OFFICE
CERTIFICATE OF CORRECTION

| | | |
|---|---|---|
| PATENT NO. | : 8,573,762 B1 | Page 1 of 1 |
| APPLICATION NO. | : 13/679989 | |
| DATED | : November 5, 2013 | |
| INVENTOR(S) | : Prasad | |

It is certified that error appears in the above-identified patent and that said Letters Patent is hereby corrected as shown below:

In the Claims:

Column 9, lines 42-43, in Claim 1, delete "di-(2-hydoxyethyl)" and insert -- di-(2-hydroxyethyl) --, therefor.

Column 9, line 55, in Claim 3, delete "di-(2-hydoxyethyl)" and insert -- di-(2-hydroxyethyl) --, therefor.

Column 10, line 21, in Claim 10, delete "di-(2-hydoxyethyl)" and insert -- di-(2-hydroxyethyl) --, therefor.

Column 10, line 39, in Claim 13, delete "di-(2-hydoxyethyl)" and insert -- di-(2-hydroxyethyl) --, therefor.

Column 10, line 56, in Claim 15, delete "(2-hydoxyethyl)" and insert -- (2-hydroxyethyl) --, therefor.

Signed and Sealed this
Twenty-ninth Day of April, 2014

Michelle K. Lee
*Deputy Director of the United States Patent and Trademark Office*